United States Patent

[11] 3,545,482

| [72] | Inventor | Melvin Paull |
| | | 8001 Rosilene, St. Louis, Missouri 63105 |
| [21] | Appl. No. | 669,126 |
| [22] | Filed | Sept. 20, 1967 |
| [45] | Patented | Dec. 8, 1970 |
| | | Continuation-in-part of application Ser. No. 284,659, May 21, 1963, now abandoned. This application Sept. 20, 1967, Ser. No. 669,126 |

[54] ELECTRONIC NONCONTACT INDICATING APPARATUS
10 Claims, 3 Drawing Figs.

[52] U.S. Cl. .................................................... 137/392, 73/304
[51] Int. Cl. ...................................................... G05d 9/00
[50] Field of Search............................................137/101.25, 392, 386; 73/290, 304, 323

[56] References Cited
UNITED STATES PATENTS

| 2,523,363 | 9/1950 | Gehman........................ | 137/392X |
| 2,648,058 | 8/1953 | Breedlove .................... | 73/304X |
| 2,858,430 | 10/1958 | Cuba et al..................... | 137/392X |
| 2,948,183 | 8/1960 | Maloy et al. .................. | 137/392X |

Primary Examiner—William F. O'Dea
Assistant Examiner—David R. Matthews
Attorney—Kingsland, Rogers, Ezell, Eilers & Robbins

ABSTRACT: The apparatus here illustrated incorporates a transmitter with an oscillator, preferably of low frequency (ca. 4000—15,000 cycles), a transmitter "antenna" probe, a receiver with a receiver "antenna" probe between them, the two probes being physically separated and arranged in out-of-contact proximity to a medium to be tested, which medium fills to varying extents a space between the probes. The medium may be solid or liquid, conductive or nonconductive. In the preferred embodiment illustrated, the medium is water in a glass tube with the probes at different levels adjacent the outside of the tube. As the medium moves into or out of the space between the probes, current flows in the receiver circuit, varying in amount with the amount of penetration of the space by the medium. Also the characteristic current curves developed for varying penetrations of different media into the space demonstrate individual peculiarities. The circuitry illustrated includes a reversing network that reverses the direction of current change produced by changing penetration of the medium into the space, e.g. from increasing current with increasing penetration, to decreasing current with increasing penetration. This affords a safety factor as will appear.

The output of the receiver is amplified, metered, and put into an actuating apparatus. Illustrated here is a liquid level control. The medium between the probes is a liquid such as water. The output operates a liquid supply valve. When the liquid level falls to a predetermined low, the signal through the receiver reaches a value causing the circuit to open the supply valve. When the liquid level is restored, the receiver signal attains an opposite value, and closes the supply valve. The circuit also includes a normally closed relay switch that opens to prevent operation in the event of excess signal current.

In the preferred form of the invention, the transmitter and receiver circuits are connected together to a single power source. In another embodiment, the two circuits are separate d.c. circuits.

INVENTOR:
MELVIN PAULL
BY Kingsland, Rogers, Ezell, Eilers + Robbins
ATTORNEYS

ELECTRONIC NONCONTACT INDICATING APPARATUS

CROSS REFERENCE

This application is a continuation-in-part of prior application Ser. No. 284,659, filed May 21, 1963 now abandoned.

BACKGROUND OF THE INVENTION

The field of the invention is the sensing electronically of variations in the quantity and nature of media penetrating to different amounts the space between two points.

The prior art includes sensing apparatus responsive to a number of different variations. Typical of classes of prior art are: equipment responsive to the difference in radiation absorbed by a liquid material and its vapor overlie (Hare, U.S. Pat. No. 2,323,128); equipment responsive to capacitance changes caused by variation of penetration of a medium into a space between plates of a capacitor (Ostermann, U.S. Pat. No. 2,354,964; Cohen, U.S. Pat. No. 2,433,599; Black, U.S. Pat. No. 2,742,609); equipment responsive to resonance in the medium of ultrahigh frequency electrical energy waves, the medium level at which resonance occurs being determined by the wave length of the generated energy in the medium (Gehman, U.S. Pat. No. 2,523,363); equipment operated by three inductance coils, two at opposite ends of the third, the two being connected to produce equal and opposite magnetic fields on the third intermediate coil except when the medium unevenly surrounds the coils and unequally affects their magnetic fields so that they produce a net magnetic field about the third coil, and hence an output signal (Breedlove, U.S. Pat. No. 2,648,058); equipment built around differences in electrical resistance of sensing elements when surrounded by one material such as liquid phase, from that when surrounded by another substance such as a vapor phase (Fred, U.S. Pat. No. 2,667,178; Carter, U.S. Pat. No. 2,707,482); equipment operated by change in inductance of an inductance coil caused by penetration into the field of a medium (Cuba, U.S. Pat. No. 2,858,430). It is intended that the foregoing summaries should be taken as substitutes for the full explanations given in the patents listed. Other patents in the same classes may also be referred to.

SUMMARY OF THE INVENTION

The present invention consists of equipment and procedures to determine the degree of penetration of a medium into a test area, or to detect changes in the nature or quality of a medium in the test area, without requiring physical contact between the equipment and the medium, the equipment having similarities to a simple transmitter-receiver combination that can be made and operated easily, can operate at safe low voltages, and can act at relatively low frequencies, thereby minimizing sensitivity to external factors and minimizing the requirements of screening. It also includes a reversing circuit and safety relays, both having safety advantages. It also includes the use of a receiver-type circuit arrangement including an antenna probe located to be affected by being outside of or submerged in a medium, such that the current in the receiver circuit varies with the changes in the nature, quality, or quantity of the medium in the test area.

Figure 1:
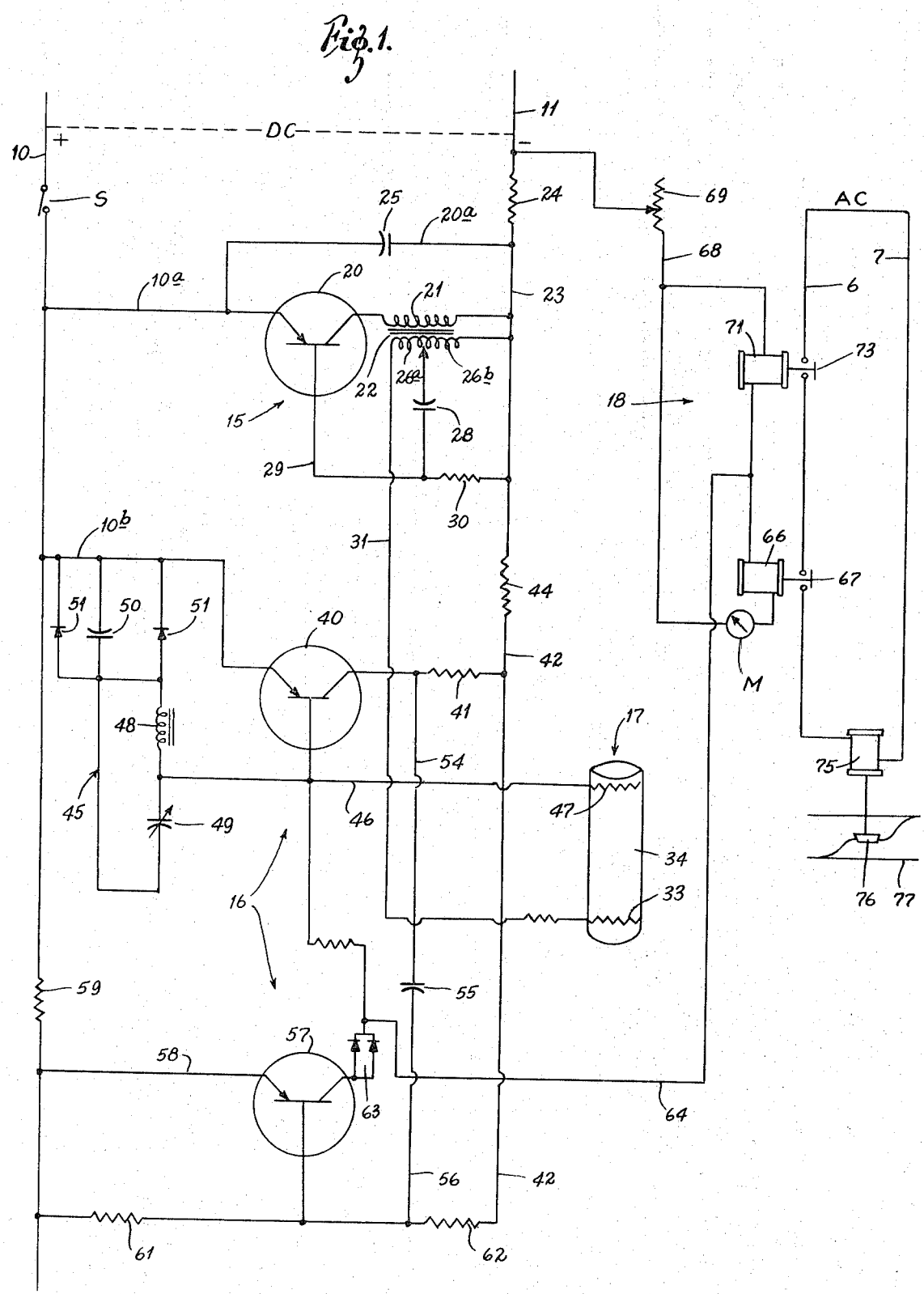
FIG. 1 is a schematic wiring diagram of a preferred form of complete transmitter-receiver network.

In the preferred form illustrated in FIG. 1, the transmitter and receiver portions of the circuitry are integrated and operated from the same DC power source.

In FIG. 1 a DC and an AC circuit are shown. It is understood that the DC circuit may be derived by smooth rectification from the alternating current. This preferably is to be obtained by the use of a zener rectification circuit. The DC circuit may be a low-voltage circuit, since, as will appear, the apparatus uses transistors and the span of transmission through the medium to be sensed is small.

Referring to the drawing, the AC circuit comprises wires 6 and 7, while the DC circuit includes a positive wire 10 and a negative wire 11.

An oscillator generally indicated at 15, and an amplifier-receiver 16 are connected between the DC lines 10 and 11. A sensing system 17, which consists of two spaced antenna-like probes, as will be described, forms the operating connection between the oscillator and the amplifier-receiver. An output relay network generally indicated at 18 is also connected to the amplifier.

The oscillator circuitry is not of itself unique, and may comprise one of the well-known oscillator networks. The values given herein for electrical components are intended to be explanatory and not limiting. Referring to the illustrated oscillator 15, there is a power transistor 20 having emitter, collector and base. It can be a type SK3009. The wire 10 is connected by a branch 10a to the emitter of the transistor 20. The collector thereof is connected through the primary 21 of a transformer 22 and thence to the negative line 23 and through a resistor 24 to the negative power supply wire 11. A capacitor 25 (250 mf.) is connected across the transistor 20 from the wire 10a on the emitter side to the negative line 23, by a wire 20a.

The transformer 22 has a split secondary 26a, 26b. One side of the secondary 26b is connected to the negative line 23. The center tap is connected through a capacitor 28 to a wire 29 connected to the base of the transistor 20. This capacitor may be adjustable for providing a desired oscillator frequency. Typical values are 0.0047, 0.0025, 0.0020, 0.0015, 0.0010 mf. The wire 29 is also connected through the resistor 30 (220 K) to the negative line 23.

The other end of the secondary 26a of the transformer 22 is connected by a wire 31 to an antenna-like probe 33 here consisting of a coil, adjustably located along the outside of a water glass 34. This glass tube is of the type connected to a tank so as to have a liquid level corresponding to the liquid level in the tank.

It can be seen that the secondary 26b is connected to provide a feedback for the transistor 20. The characteristics are determined so that this transistor will preferably produce pulses at approximately 8,000 to 16,000 cycles per second, but has operated as low as 3,500 cycles, producing several harmonics.

The foregoing circuitry, including the oscillator 15 and the open ended antenna-like probe 33, constitutes, in effect, a transmitter. The probe 33 acts as a transmitting antenna.

The receiver portion 16 of the circuitry includes a first transistor 40 (that may be a type 2N1702) with its emitter connected to the branch 10b of the positive power line 10. Its collector is connected through a resistor 41 (120 K) to an extension 42 of the negative line 23, that is connected to the previously mentioned negative line 23 through a resistor 44 (10,000o.) A tuning network 45 is also connected to the positive wire 10b at one end, and at its other end by a wire 46 to a second probe 47. The probe 47 acts as an open ended receiving-type antenna, and similarly to the probe 33, is here shown as a coil wrapped around the outside of the water glass tube 34 and is adjustable therealong, to vary the location of the area of sensing, as well as the limits thereof.

The tuning network 45 is not absolutely essential in many cases, but it has advantages as will appear. As illustrated, the wire 46 connects between an inductance 48 and a variable capacitance 49 (8—260 mmf.) in a loop network that in turn is connected through a capacitor-rectifier parallel loop, comprising a capacitor 50 (100 mf.) and one or more parallel-connected rectifiers 51 (type 1N1702). The loop is connected to the positive wire 10b that is connected to the emitter of the transistor 40. The network 45 is tunable to be in resonance when it receives a signal of a frequency developed by the oscillator network.

The collector side of the transistor 40, ahead of the resistor 41, is connected by a wire 54 through a capacitor 55 (0.005 mf.) and thence by a wire 56 to the base of a second stage of amplification including an amplifying transistor 57 (type 99B5). The emitter of the transistor 57 is connected by a wire 58 through a resistor 59 (1,000.) to the positive power line 10. The positive line 58 is also connected through a resistor 61 (10,000o.) to the wire 56. The wire 56 is connected through a resistor 62 (1 meg.) to the negative line 42 and ultimately to the main negative power line 11.

The collector of the transistor 57 is connected through rectifier 63 (type 1N1702) by a wire 64 into the output network 18. It branches through a coil 66 of a first relay having a switch 67 in the AC power lines 6, 7. The DC circuit continues from the coil 66 by a wire 68 through a variable resistor 69 and thence to the power line 11. A milliammeter M (typically 0—3 ma.) in series with the coil 66 measures the current through the output network, which is a function of the amount or nature of medium between the probes 33 and 47.

The wire 64 also branches through a relay coil 71 that controls a switch 73 also in the AC lines, 6, 7. (Of course, the AC lines could be direct current power). The other side of the coil 71 is connected to the wire 68. The relay switch 73 is normally closed. The coil 71 has greater impedance than the relay coil 66 has, (or its contacts may have a wider air gap) and requires a greater current for operation of the switch 73. It is an excess-current safety relay. The relay switch 67 is normally open, and therefore normally breaks the AC circuit from AC lines 6 and 7 through a coil 75 of a solenoid valve 76 in a water pipe 77 that is adapted to control the flow of water to the tank, the liquid level in which is indicated in the glass 34.

It will be noted that the transmission and receiving networks are both operated from the same power source, being connected in parallel across the power lines 10 and 11.

OPERATION OF FIGURE 1

At the start, assuming the liquid level adequate, the AC circuit is open at the switch 67, and the valve 76 is closed. The AC switch 73 is also closed. DC power is introduced by closing the switch S indicated in the main power circuit line 10.

When the liquid level in the tube 34 declines to a predetermined low, the following action occurs. The oscillator 15 is producing a signal on the probe 33 at a predetermined frequency. The probes 33 and 47 are so coupled by the presence of vapor or air, perhaps with some water, that the signal will be picked up by the probe 47 and amplified through the amplifier system 16, through the line 64 to the relay network 18, to cause the relay coil 66 to close its switch 67 and admit AC power to the solenoid valve coil 75 and cause it to open the valve 76. The liquid level in the tank and tube 34 then builds back up, the signal transmitted between the probes 33 and 47 changing as the level increases, causing the meter M to move. This meter can be calibrated in units of the height of the liquid. When the liquid level reaches a predetermined height, the current becomes inadequate to hold the relay switch 67 closed, and it then opens, causing the valve 76 to close.

It is preferable that the probes 33 and 47 be loops, since the energy coupling between them is then easier and better. With coaxial loops, the oscillations transmitted from the probe 33 cut the loop 47 to a maximum degree.

If, owing to some short circuit or otherwise, a current substantially higher than the maximum current required for operation of the relay 66 flows through the output circuit wire 64, the coil 71 will become sufficiently energized to open the switch 73. This will cause the valve 76 to be closed, cutting off the water and indicating thereby something wrong with the apparatus.

OPERATION OF FIG. 2

Figure 2:
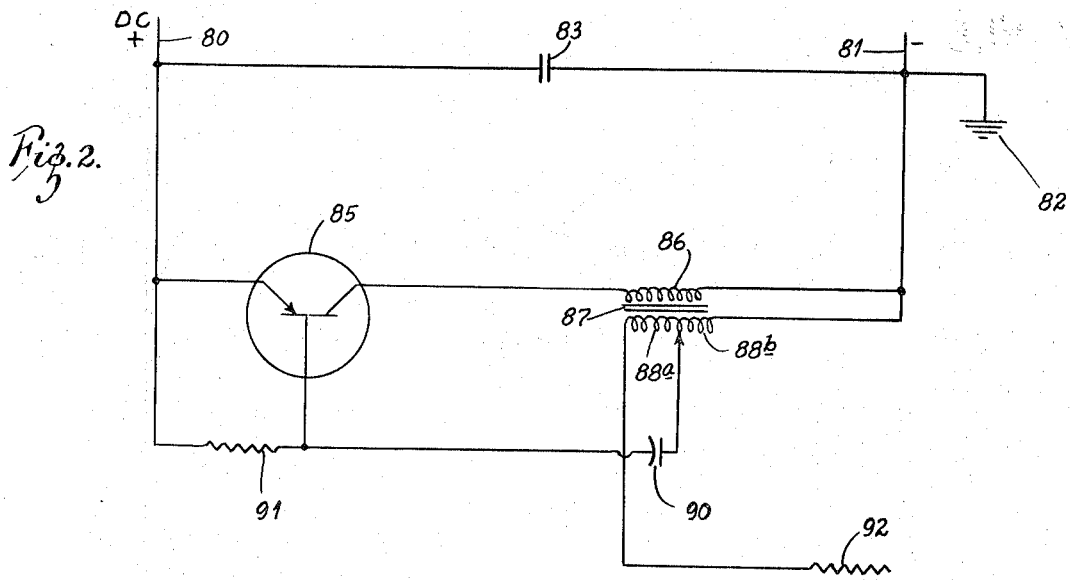
FIG. 2 is a schematic diagram of a separate transmitter-type circuit arrangement.

FIG. 2 shows a separate transmitter. The DC power source has a positive wire 80 and a negative wire 81, the latter grounded at 82. A capacitor (250 mf.) 83 is connected across the lines 80—81. Also connected across the lines 80—81 is a transistor 85 (type SK3009), in series with the primary 86 of a transformer 87.

The secondary of the transformer is center-tapped, providing sections 88a, 88b. The section 88b is connected at one end to the negative wire 81, and at its other end to a capacitor 90 and the base of the transistor 85. A resistor 91 connects the positive line 80 and the base. The capacitor 90 is variable to adjust the frequency.

The secondary 88a is connected directly to the antenna probe 92, which is similar to the probe 33.

It will be apparent that this circuit of FIG. 2 acts similarly to the transmission portion of FIG. 1, and will cause pulsating energy to be sent outward from the probe 92.

Figure 3:
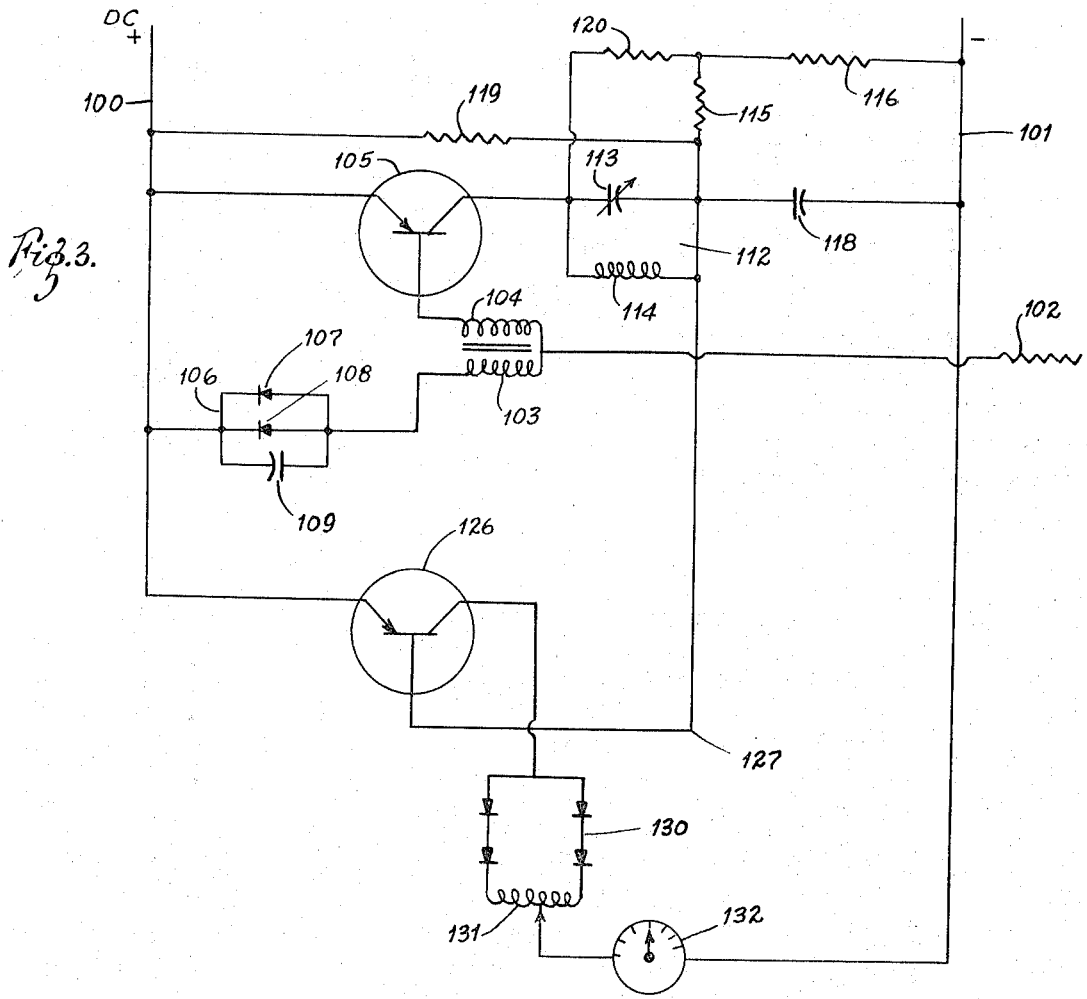
FIG. 3 is a schematic diagram of a separate receiver-type circuit arrangement that can accept signals from apparatus such as that of FIG. 2.

FIG. 3 shows a separate receiver section. It can be supplied from an independent power source, with positive DC wire 100 and negative wire 101.

The receiver antenna probe 102 is connected typically through both windings 103 and 104 of a transformer. The winding 104 is connected in the base circuit for a transistor 105 (type 2N3702). The other winding 103 is connected to a rectifier-capacitor tank 106 to the positive wire 100.

The rectifier-capacitor tank comprises two rectifiers 107, 108 (type 1N1702) and a capacitor 109 (100 mf.) all in parallel as indicated.

The output circuit of the transistor 105 comprises the positive wire 100, the emitter and collector of the transistor, and, preferably, a tuning tank 112 made up of a capacitor 113 and an inductance 114 in parallel. The capacitor may be adjustable to change the resonant frequency. From the negative side of the tank 112, the circuit can continue to the negative wire 101 through appropriate resistance that can be chosen to provide the proper range of voltage drops. These may include the resistor 115 (1 meg.) the resistor 116 (10 K). The optionally usable capacitor 118 can also be used. A resistor 119 (10 K) is connected around the transistor 105 and tank 112, and a resistor 120 (220 K) is connected around the tank 112 and resistor 115.

The output of transistor 105 is used to bias another transistor 126 (type 99B5), the tank 112 being connected by a wire 127 to the base thereof. The emitter of this transistor 126 is connected to the positive wire 100. The output circuit of this transistor 126 includes the positive wire 100, the emitter, the collector, a rectifier tank 130 containing four rectifiers (type 1N1702) connected into a coil 131 as illustrated. A center tap from the coil leads through a meter 132 here typifying a useful load for the receiver. As is obvious other loads could be used.

It is not intended to state conclusively the basis for operation of the present invention. The results are that when the transmitter is working, currents appear in the receiver that vary with the quantity of a given medium between the probes, and that vary with the composition of the medium. For example, if the tube 34 be glass, and isopropyl alcohol be supplied thereto in increments from a point 3 inches below the transmitter probe 33 to a distance above the receiver probe 47, it is found that the meter readings at M, in milliamperes, decrease fairly steadily with rise in liquid level from below the transmitting probe to the level of the receiving probe, but remain constant above the latter.

A test run with a glass tube containing different levels of liquid, was made with the transmitting probe 8 inches above the bottom and the receiving probe 3 inches above the bottom. Liquid was introduced and meter readings taken from the bottom up. Current increased as liquid rose from the bottom to the receiving probe, then rather steadily decreased to a point 2 inches above the transmitting probe. With a similar arrangement but reversing the probes, the current increased, but to a lesser degree as liquid rose up to the transmitter probe, then decreased at a small rate as liquid rose to the receiving probe. Just below the latter, a sharper rate of decrease began, the current when the liquid was opposite the receive probe being substantially less, and remaining so as the liquid rose above the receiver probe.

The liquid in the last tests was water. When NaCl was added, substantially different values were obtained. In this case, with the receiver probe at the top, the initial reading, with the liquid 3 inches below the transmitter probe, was higher than before. Readings decreased sharply as liquid rose to adjacent the transmitter probe. As liquid rose from there to adjacent the receiver probe, the current remained nearly constant, but reached a minimum at the upper probe and remained so above it.

Some of the initial readings must be qualified by the fact that the surface of the tube may be wet. However, a peculiar function of the present apparatus is a rapid elimination of any liquid film between the probes.

In another test, with the tube filled with air, a reading of 2.4 ma. was obtained. When a copper tube was inserted into the glass tube, between the probes, the reading became 2.8 ma. When a wire of solder was substituted for the copper, the reading became 3.2 ma. Yet with water in the tube substituted for air, the readings for water, copper and solder remained fairly alike, all being substantially lower then the previous readings.

In the present apparatus, the tuning circuit for the receiver is not essential, but does increase the sensitivity. Without it and the reversing tube 40, the current in the receiver increases as the liquid approaches the receiver probe 47. With the reversing apparatus included, the current decreases as the liquid rises. This adds an important safety feature.

In the present apparatus, in the preferred construction of FIG. 1, a nonconductive chassis is normally used, without generally grounding. In FIGS. 2 and 3 two separate circuits are used. This latter arrangement indicates that the coupling between the probes is similar to the transmitter-receiver coupling rather than to a more basic simple coupling such as simple capacitance.

The last is further indicated by the fact that one probe may be moved a considerable distance away from the glass tube without rendering the apparatus inoperative. There is some loss of amplitude of signal, with increased distance up to several feet, but the signal still remains adequate.

It is evident that the apparatus can be used to sense the amount of penetration of a given liquid into the space around two probes. It can also be used to detect a change from one kind or quality of material to another.

In a test using the present circuitry (FIG. 1) but with the probes changed to metal plates disposed vertically on opposite sides of the glass tube, tests were run with oil, water, and metals introduced into the tube to extend different extents into the space between the plates. Under these conditions, the current in the meter fell in amount as the oil or the metals penetrated further, the oil (nonconductive) causing a greater fall than the metals. But with water, the current rose. The water was available city water, not distilled.

Various changes and modifications may be made within the process of this invention as will be readily apparent to those skilled in the art. Such changes and modifications are within the scope and teaching of this invention as defined by the claims appended thereto.

I claim:

1. In apparatus for sensing a medium in a receptacle between two points, which medium is subject to change in its quality of transmission of electromagnetic energy between the points, comprising: a pair of open ended probes at spaced points on the receptacle; an oscillator having its output connected to one probe and adapted, when energized, to transmit oscillations of predetermined frequency to the probe to be directed through the medium toward the other probe; a receiver connected to the other probe, to receive the signal produced therein by the transmitted oscillations, the change in the medium as aforesaid changing the amplitude of the signal received by the receiving probe, an output circuit in the receiver; and means therein adapted to operate when the signal in the output circuit attains a predetermined magnitude.

2. The apparatus of claim 1, wherein the receiver includes tuning mechanism tuned to the predetermined frequency produced by the transmitter through the medium when there is a predetermined quantity of the medium between the probes.

3. The apparatus of claim 1, wherein the output of the oscillator includes both probes.

4. In an apparatus responsive to liquid level in a receptacle; a pair of spaced antenna type probes on the receptacle but out of contact with the liquid therein; an oscillator connected to one probe; a receiver-amplifier connected to the other probe; the first probe being adapted to transmit signals through the medium within the receptacle to the other probe, the magnitude of the signals varying with the amount of liquid in the receptacle; the receiver-amplifier being adapted to receive the signal; and an output circuit including a liquid supply valve operating means, the said output circuit being rendered operable when the magnitude of the received signal has at least a predetermined value; and the liquid supply valve controlling admission of liquid to the receptacle.

5. The apparatus of claim 4 wherein the probes comprise open ended loops around the outside of the receptacle.

6. The apparatus of claim 4 wherein the receiver-amplifier is a tuned circuit, and the circuits are set up to cause the output circuit to have a high, valve-operating current when the liquid level in the receptacle is low.

7. The apparatus of claim 4, wherein the output circuit of the receiver-amplifier includes a branch having a safety relay operating coil energized to operate when the output circuit received excess current, and a relay switch operated by the coil, controlling energization of the liquid supply valve operating means.

8. In an apparatus for sensing varying conditions of a medium disposed within a limited space between two points; a pair of spaced-apart antenna-like probes, one being a transmitting probe and the other a receiving probe, the probes being disposed near the medium to be tested, the probes being spaced apart a greater distance than the air gap of a normal induction coupling of two coils whereby variations of the medium within the space between the probes alters the signal received at the receiving probe which thereby can correspond to the conditions of the medium within said space; an oscillator having an output circuit including both probes; impedance means in the output circuit; an amplifier having its circuit connected across the impedance means so that the output of the amplifier reflects the conditions of the medium between the probes; and mechanism operated by the output of the amplifier.

9. In the apparatus of claim 8, the impedance means comprising a tuning network.

10. In an apparatus for sensing the presence of a medium disposed within a limited space between two points: a sensing circuit; an antenna-like transmitter probe and an antenna-like receiver probe; the two probes being spaced apart and one of them being located adjacent the limited space wherein material to be tested is disposed but out of electrical contact therewith; a transmitter connected to the transmitter probe, the transmitter including an oscillator to provide oscillating energy at the probe and adapted when energized to transmit oscillations of predetermined frequency to the probe to be directed to the medium and to the other probe; a receiver connected to the receiver probe, including means to receive an oscillatory signal from the probe and to amplify same, the presence of the medium in the space subjected to the energy transmitted from the transmitting probe changing the signal received by the receiving probe; and actuated mechanism operated by the amplified signal.